Jan. 26, 1971 F. INDA 3,557,585
METHOD OF BENDING PIPE
Original Filed Sept. 1, 1960
15 Sheets-Sheet 1
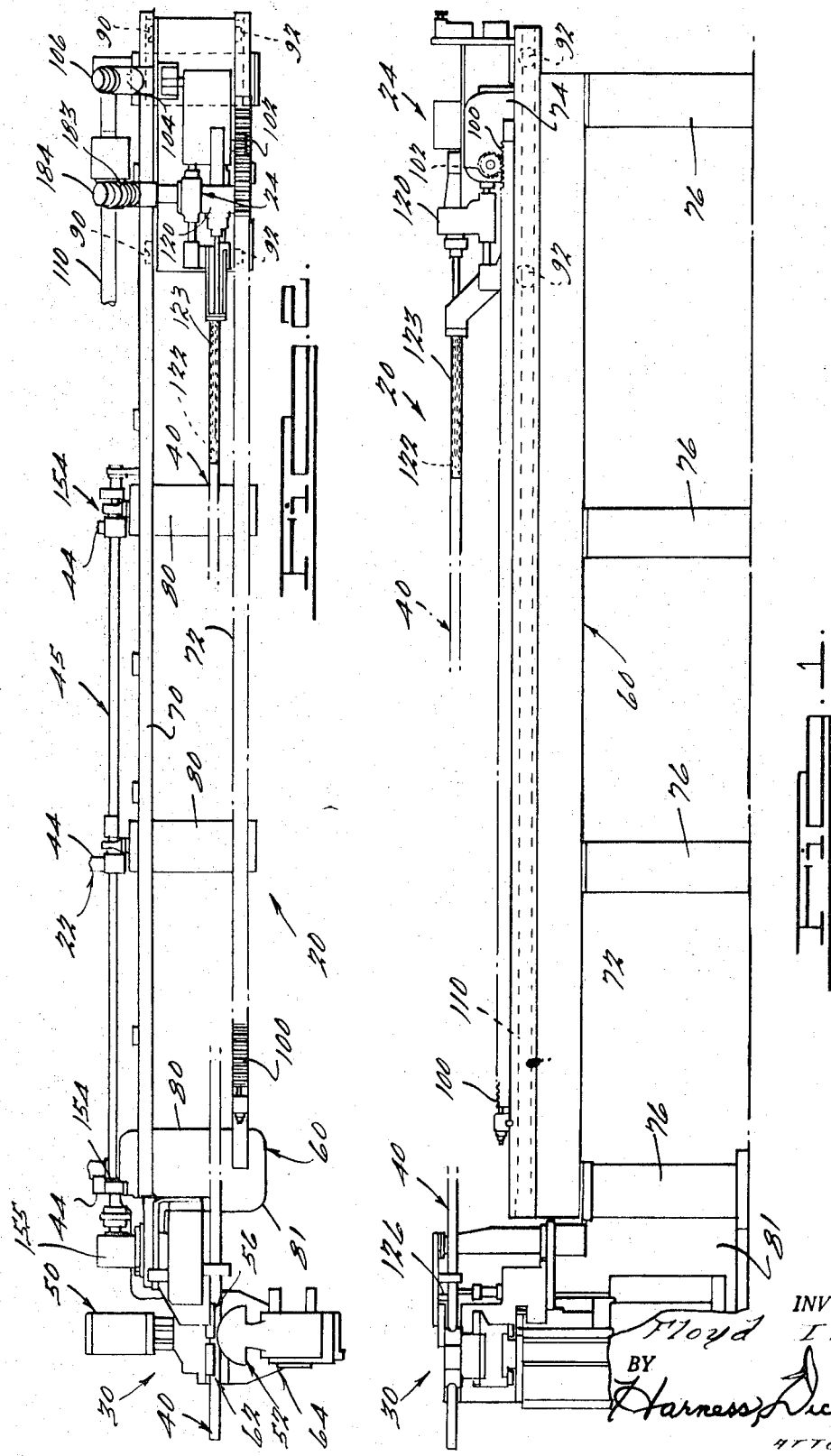
INVENTOR.
Floyd Inda
BY
Harness, Dickey & Pierce
ATTORNEYS

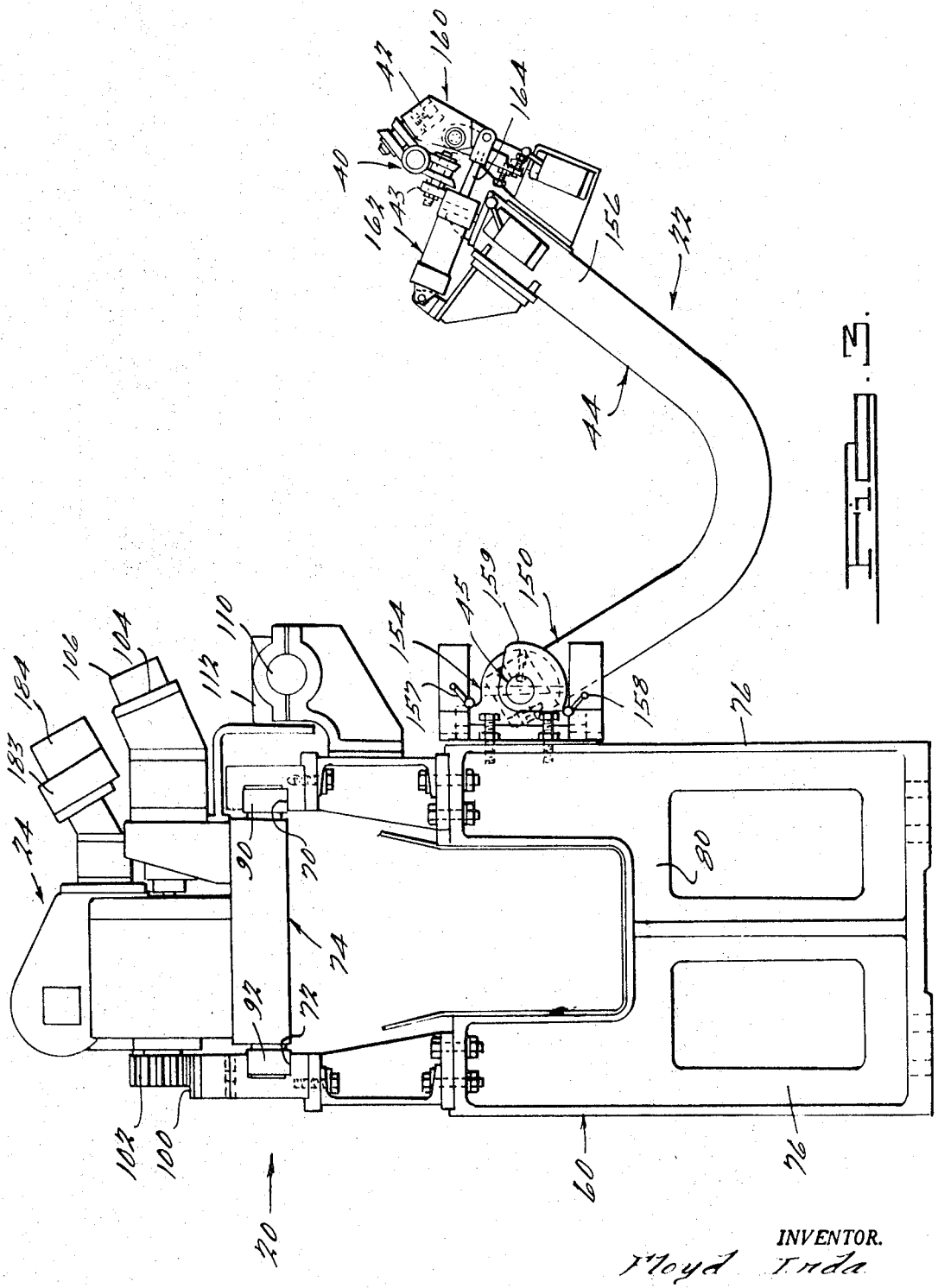

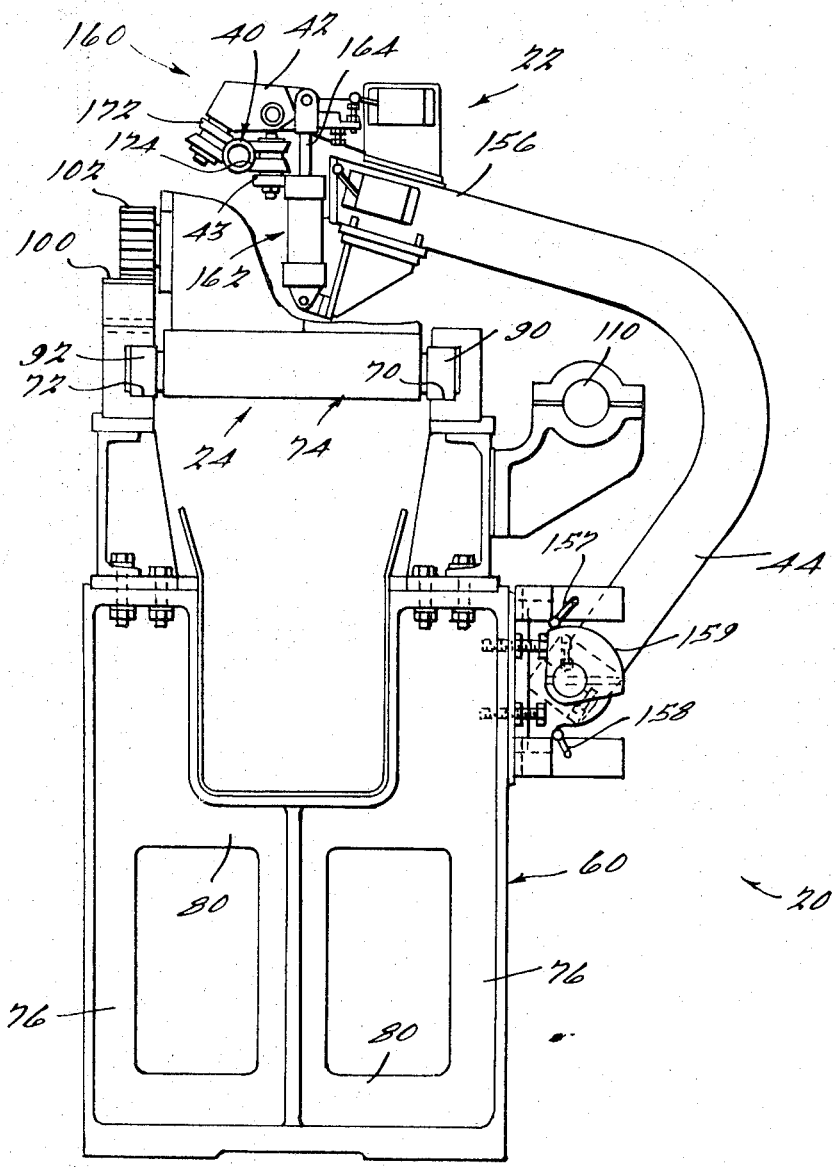

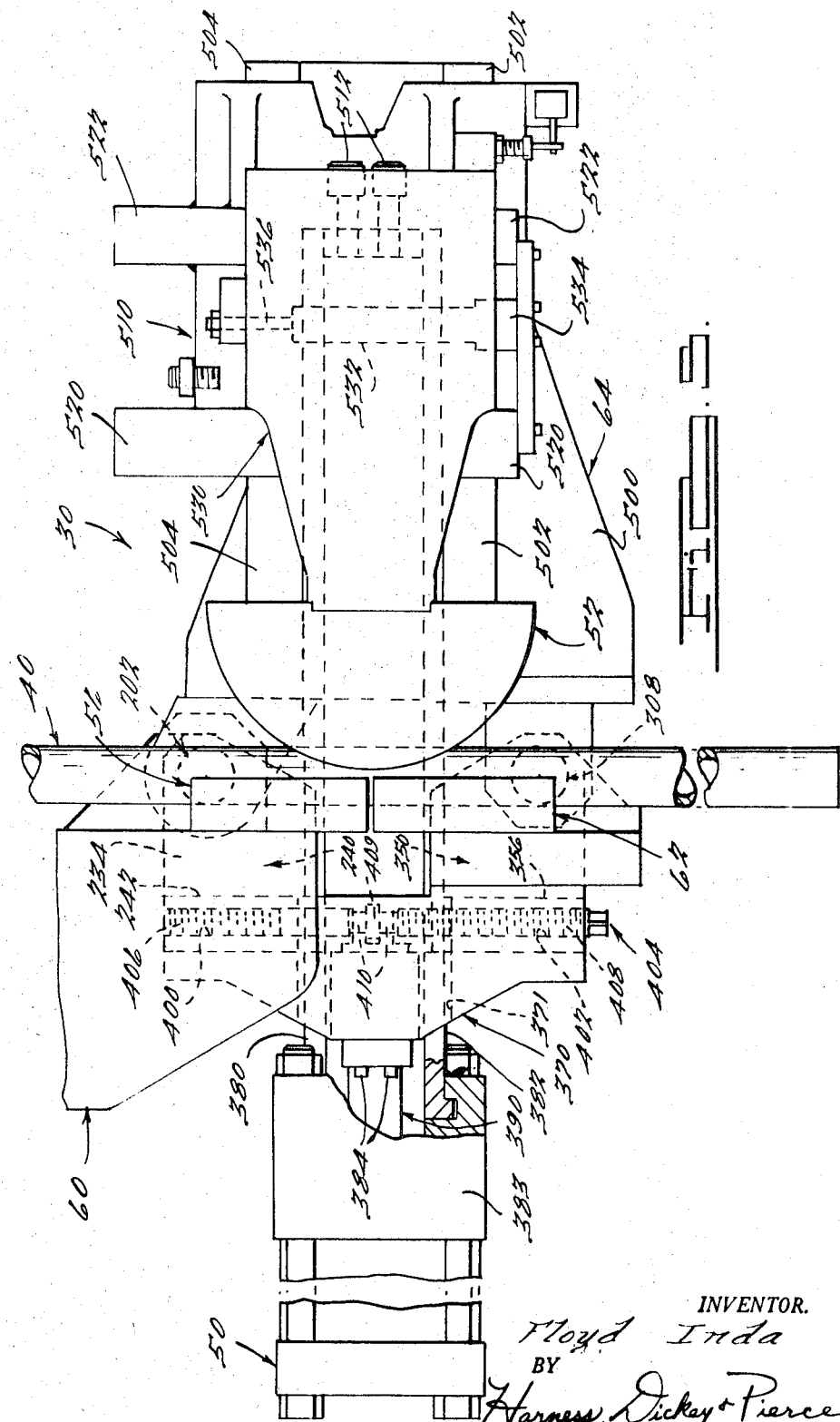

Jan. 26, 1971
F. INDA
3,557,585
METHOD OF BENDING PIPE
Original Filed Sept. 1, 1960
15 Sheets-Sheet 5
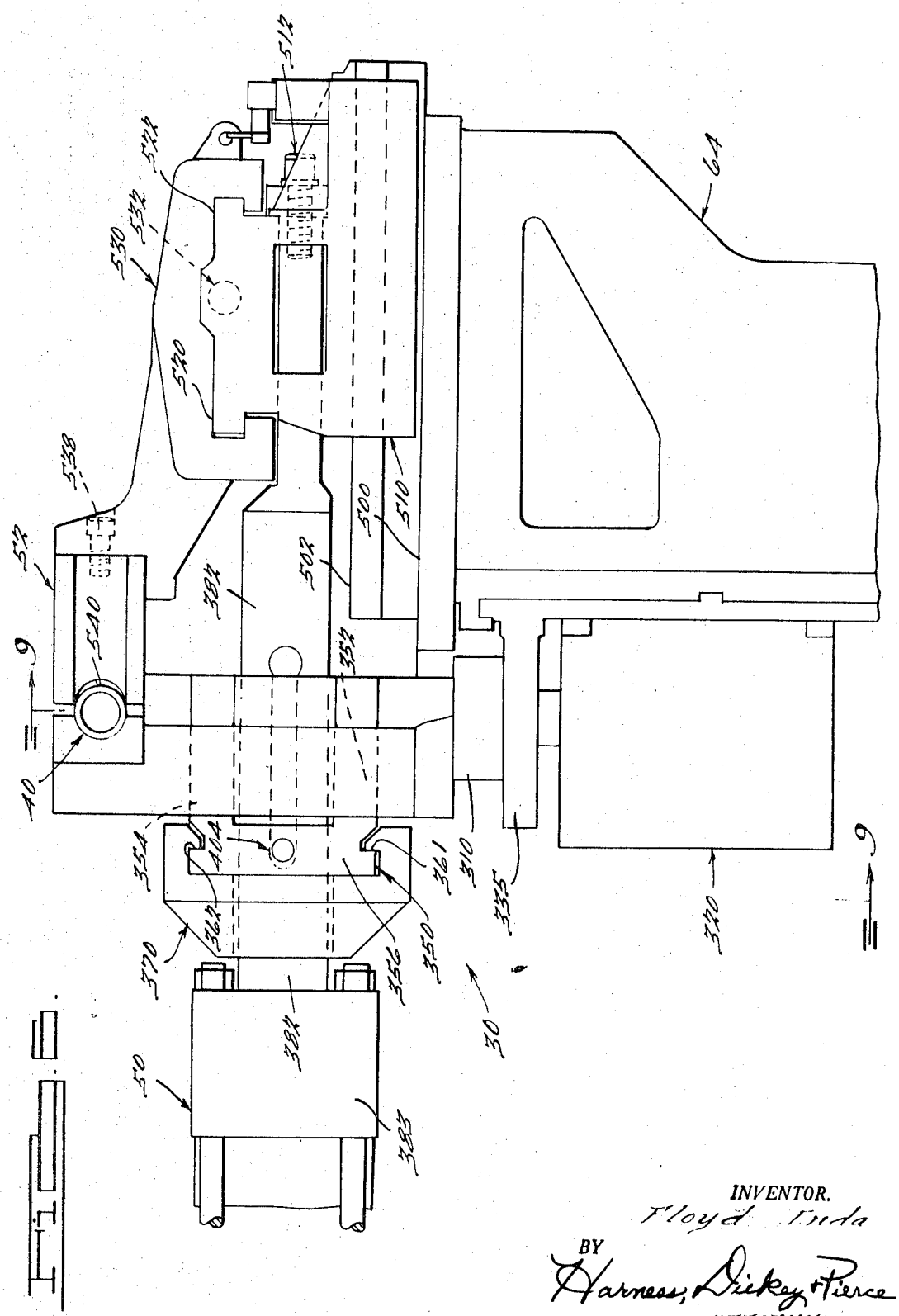
INVENTOR.
Floyd Inda
BY
Harness, Dickey & Pierce
ATTORNEYS

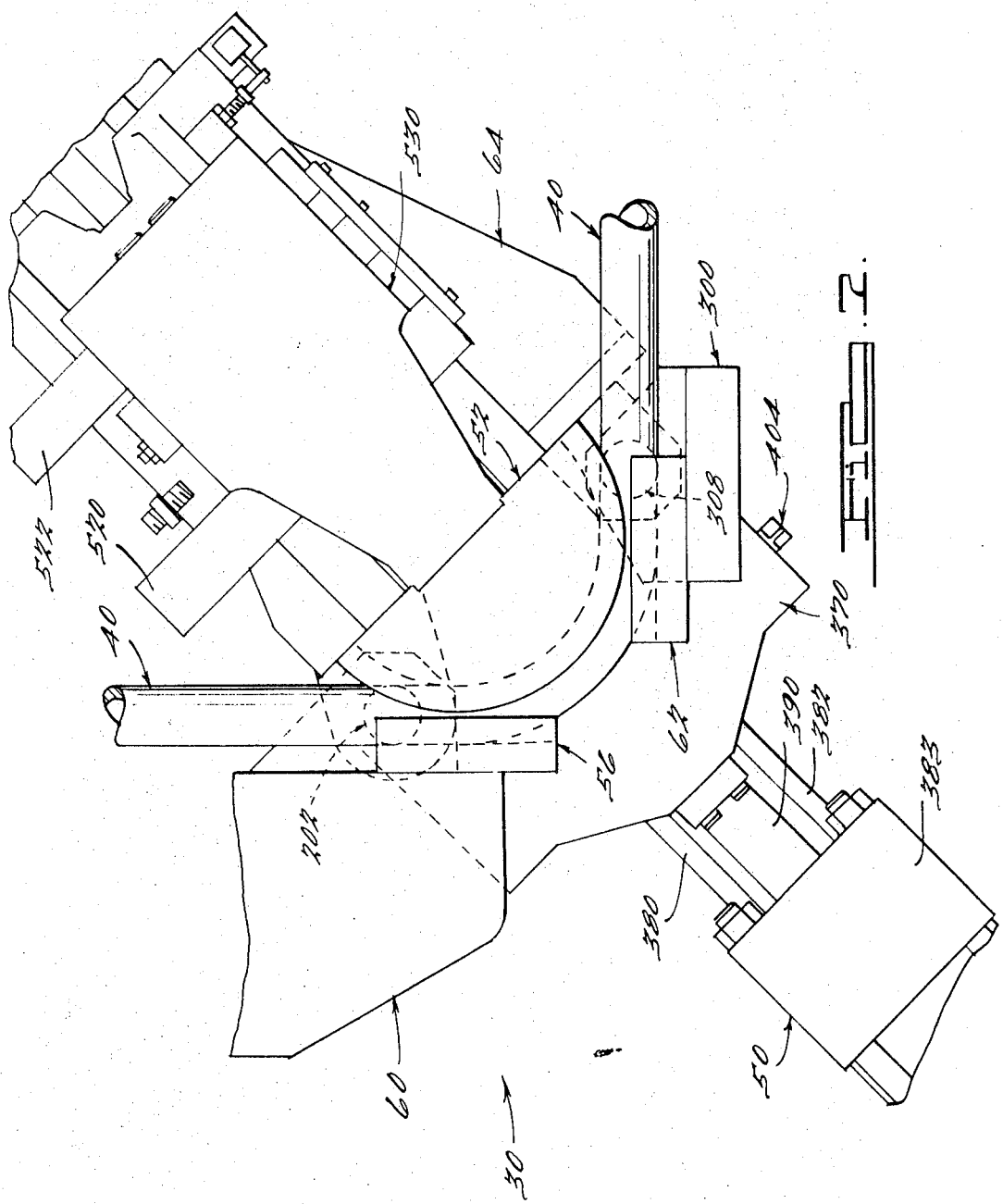

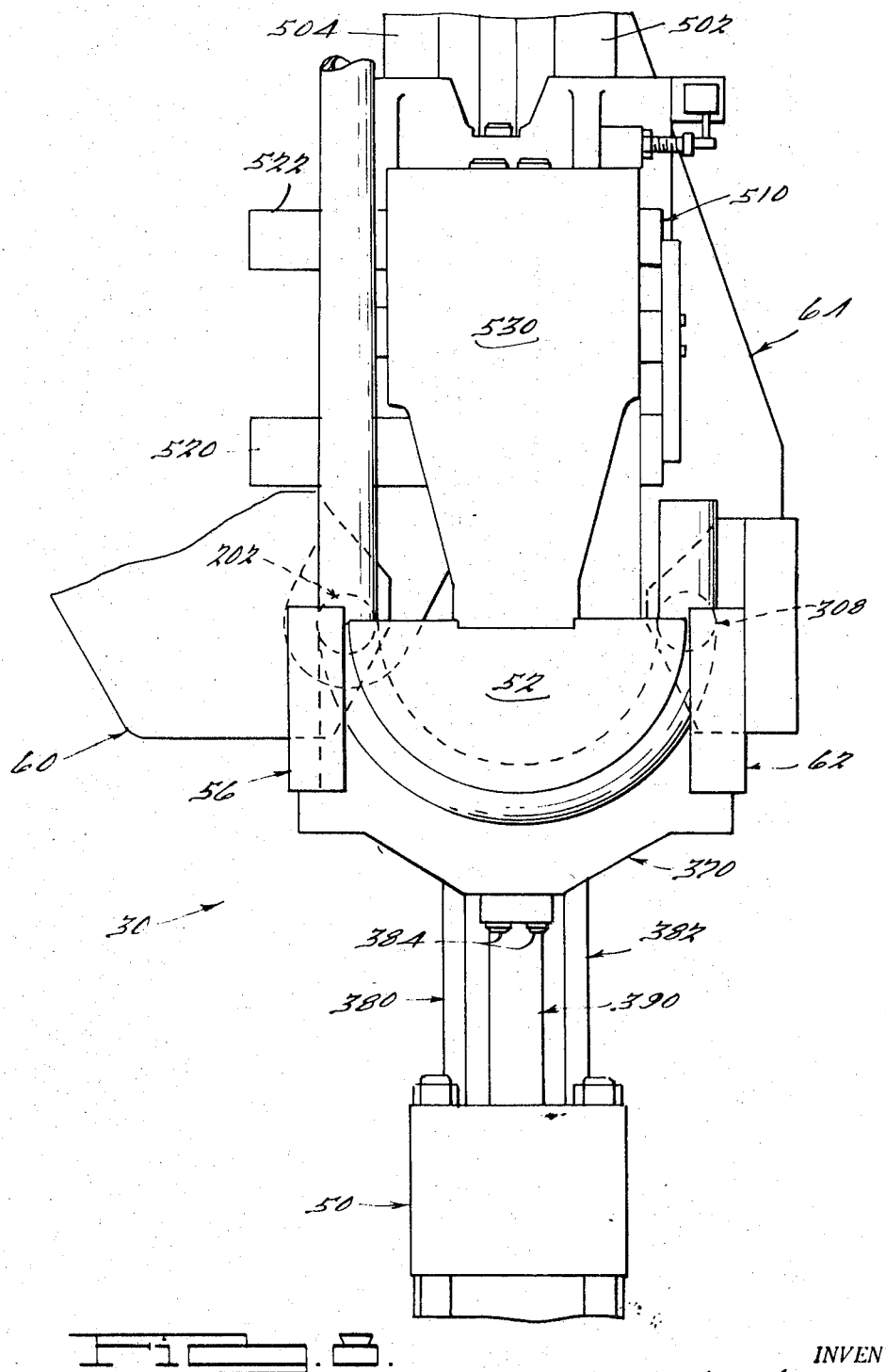

Jan. 26, 1971  F. INDA  3,557,585
METHOD OF BENDING PIPE
Original Filed Sept. 1, 1960  15 Sheets-Sheet 8
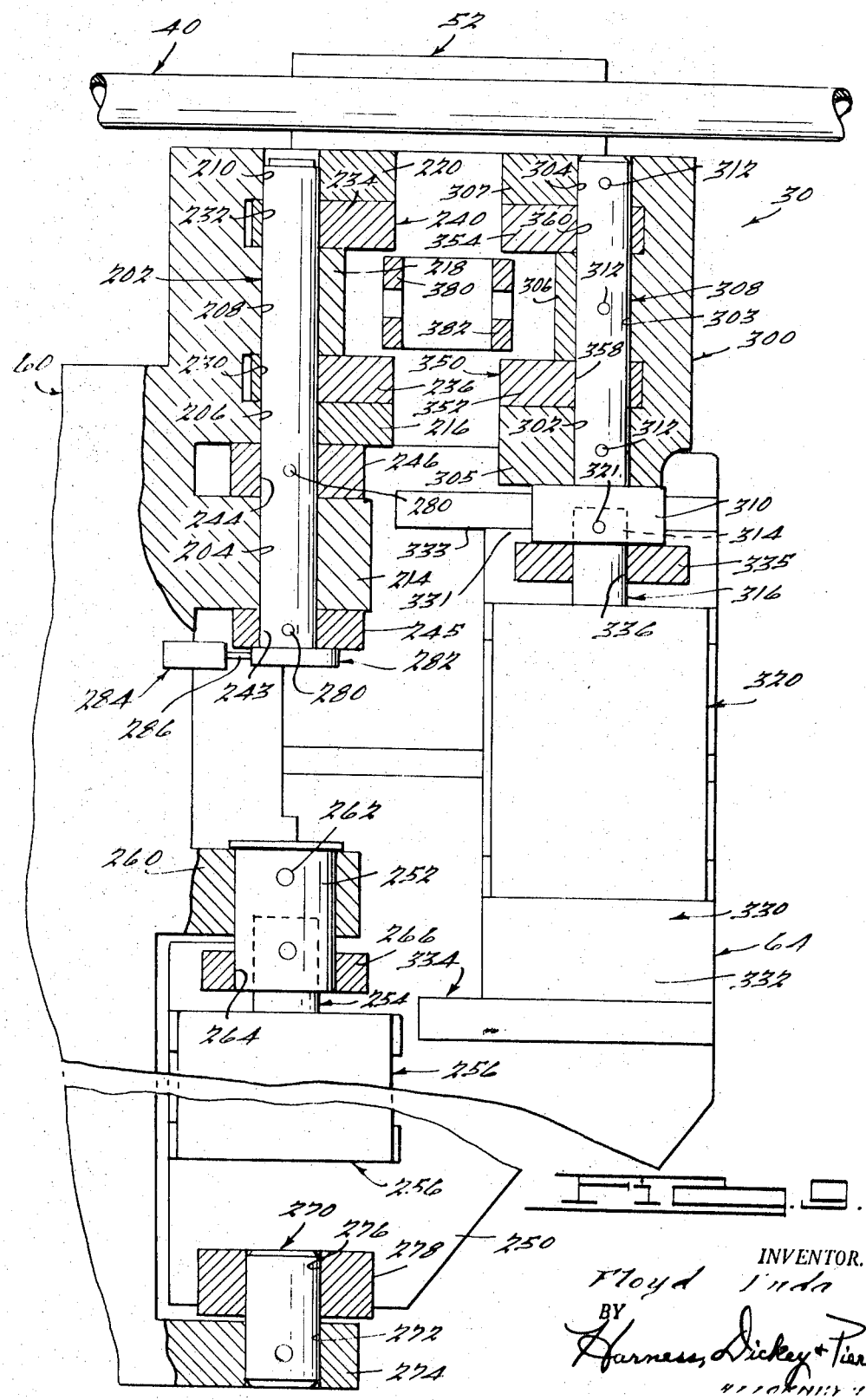
INVENTOR.
Floyd Inda
BY
Harness, Dickey & Pierce
ATTORNEYS

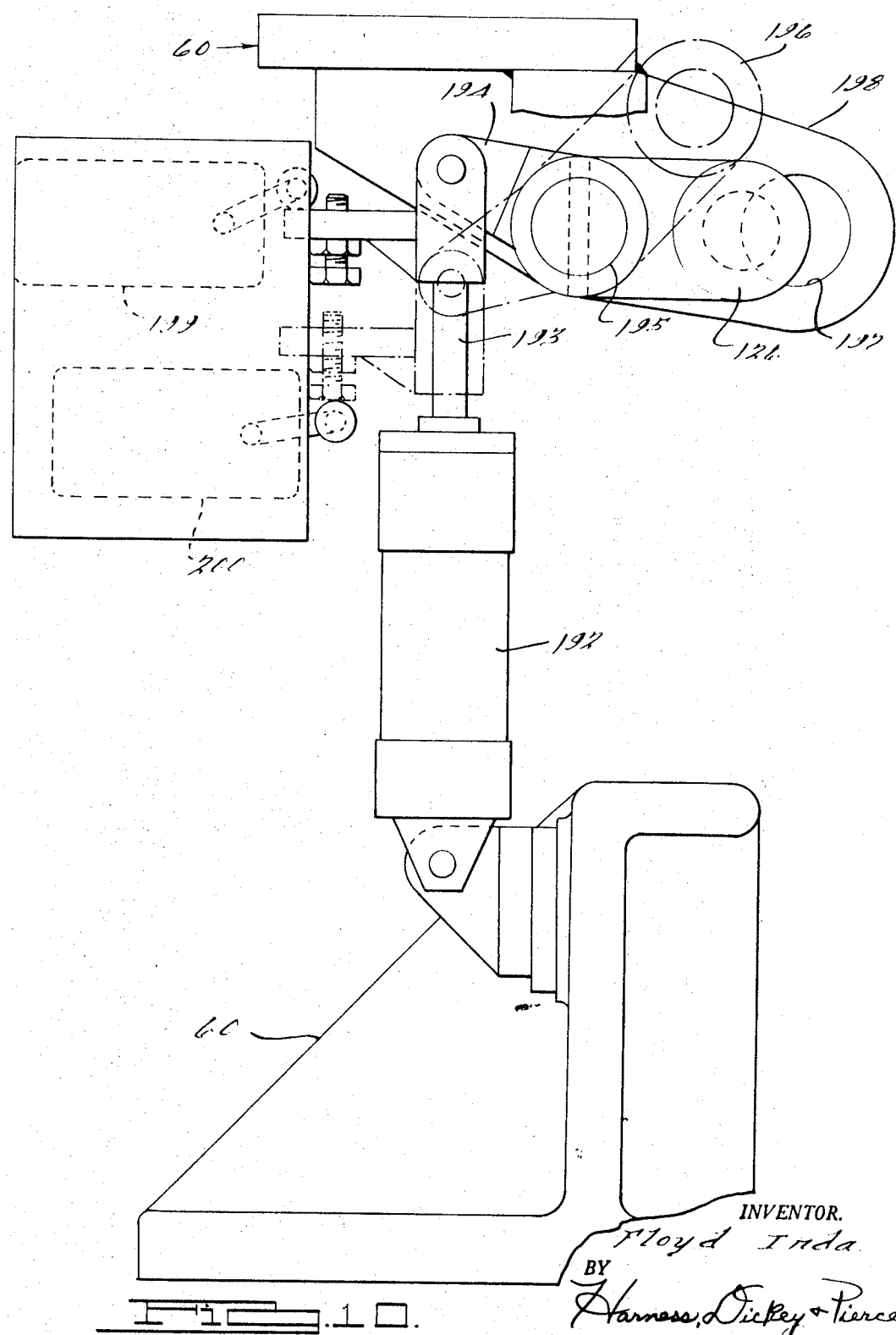

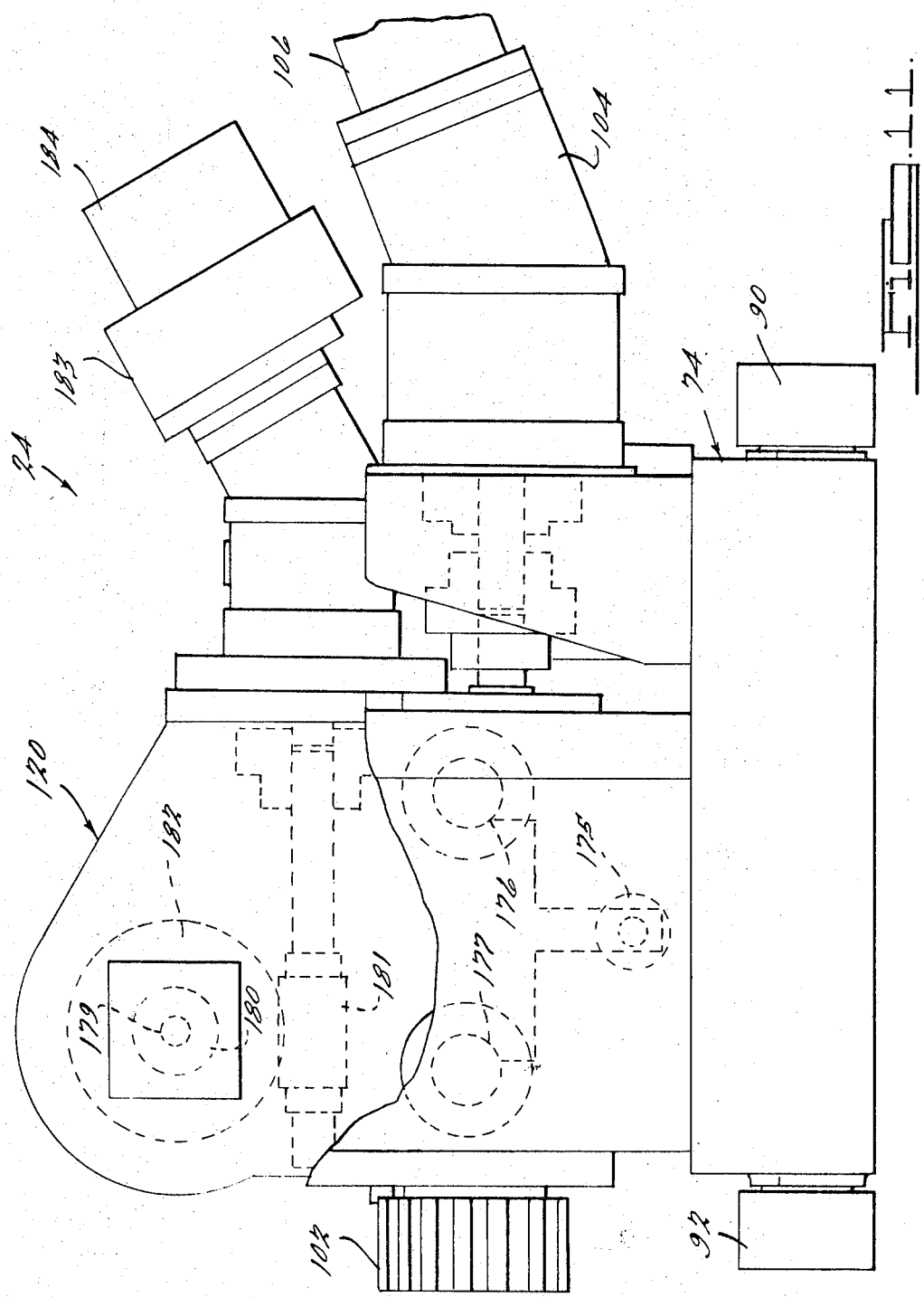

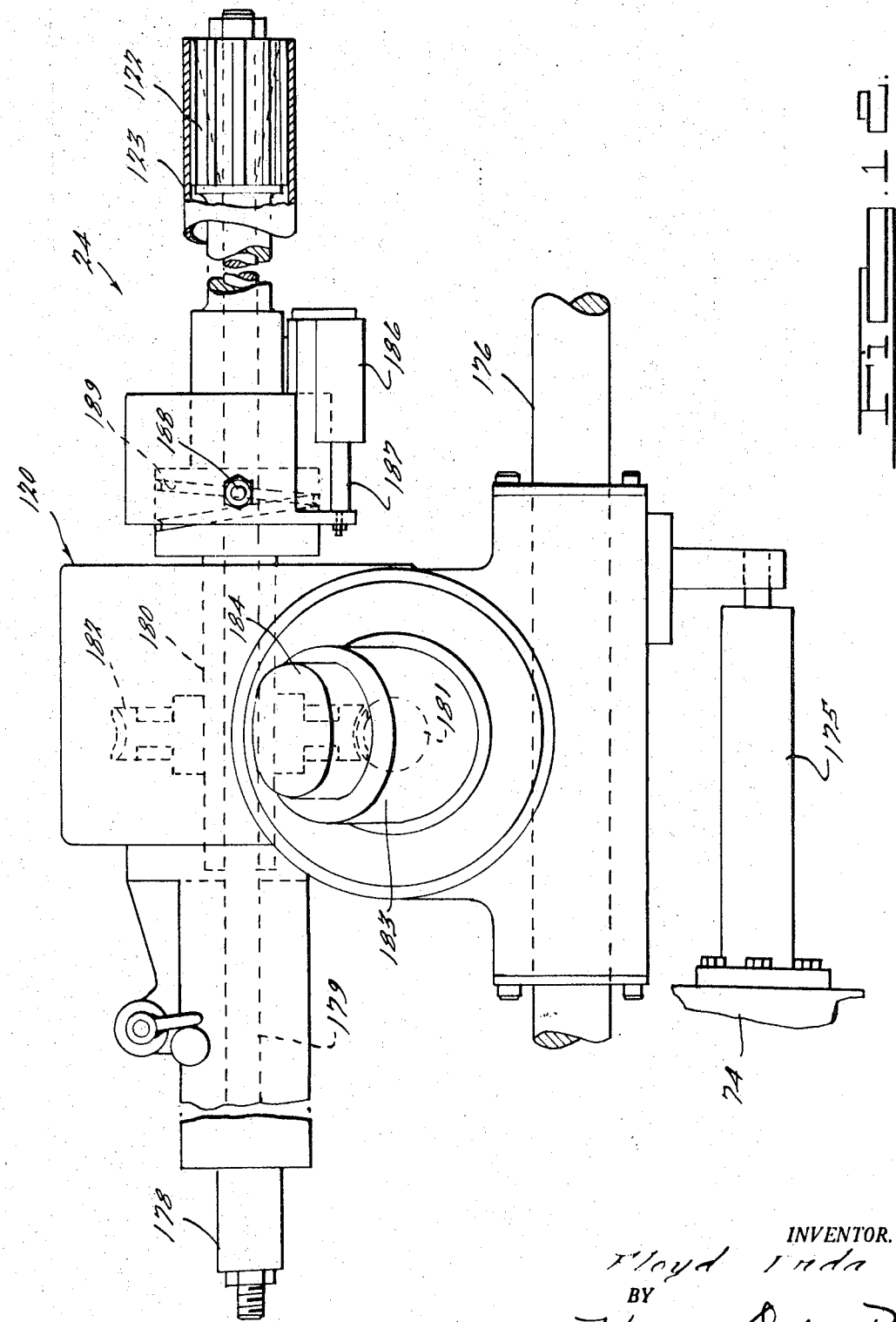

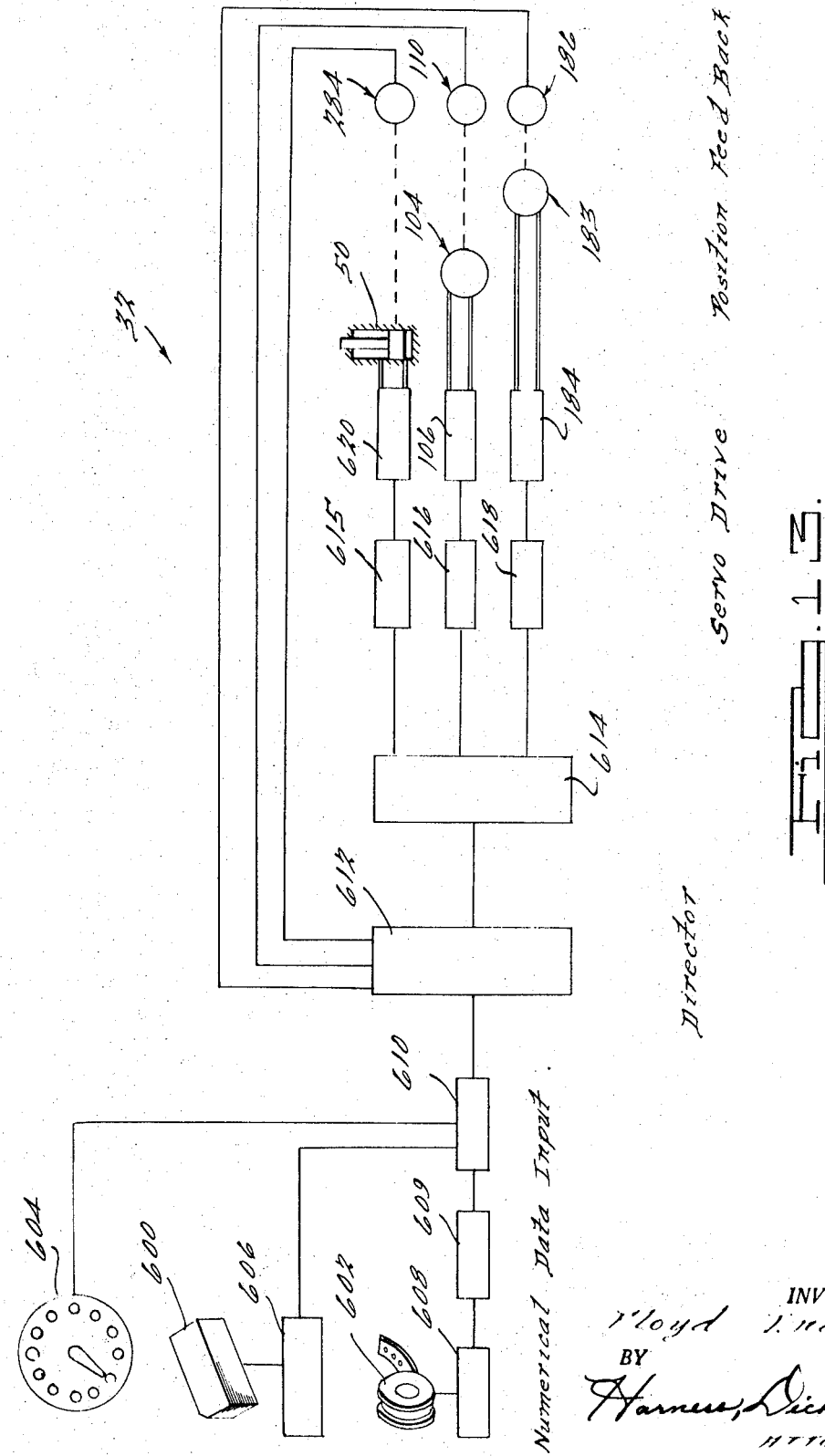

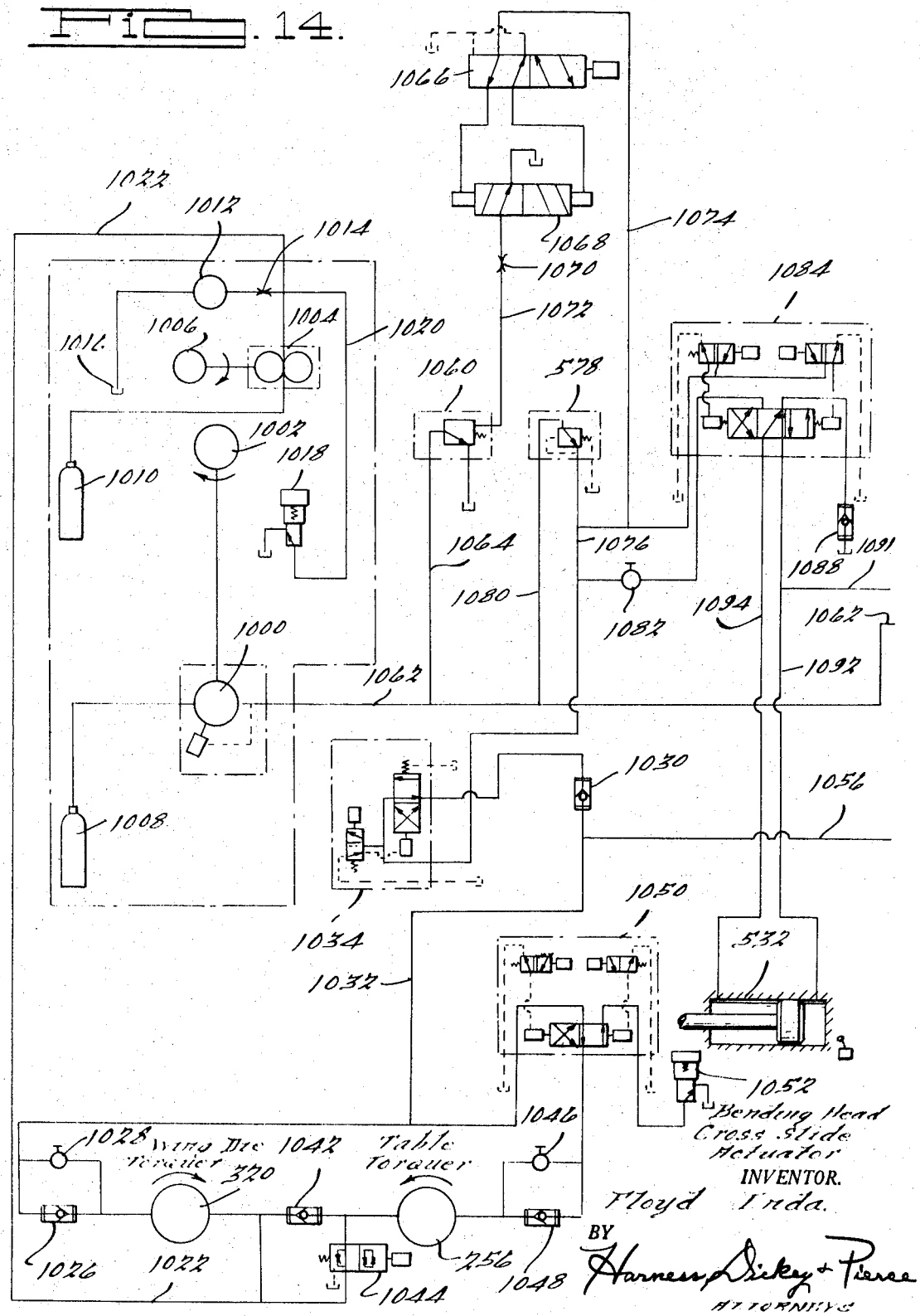

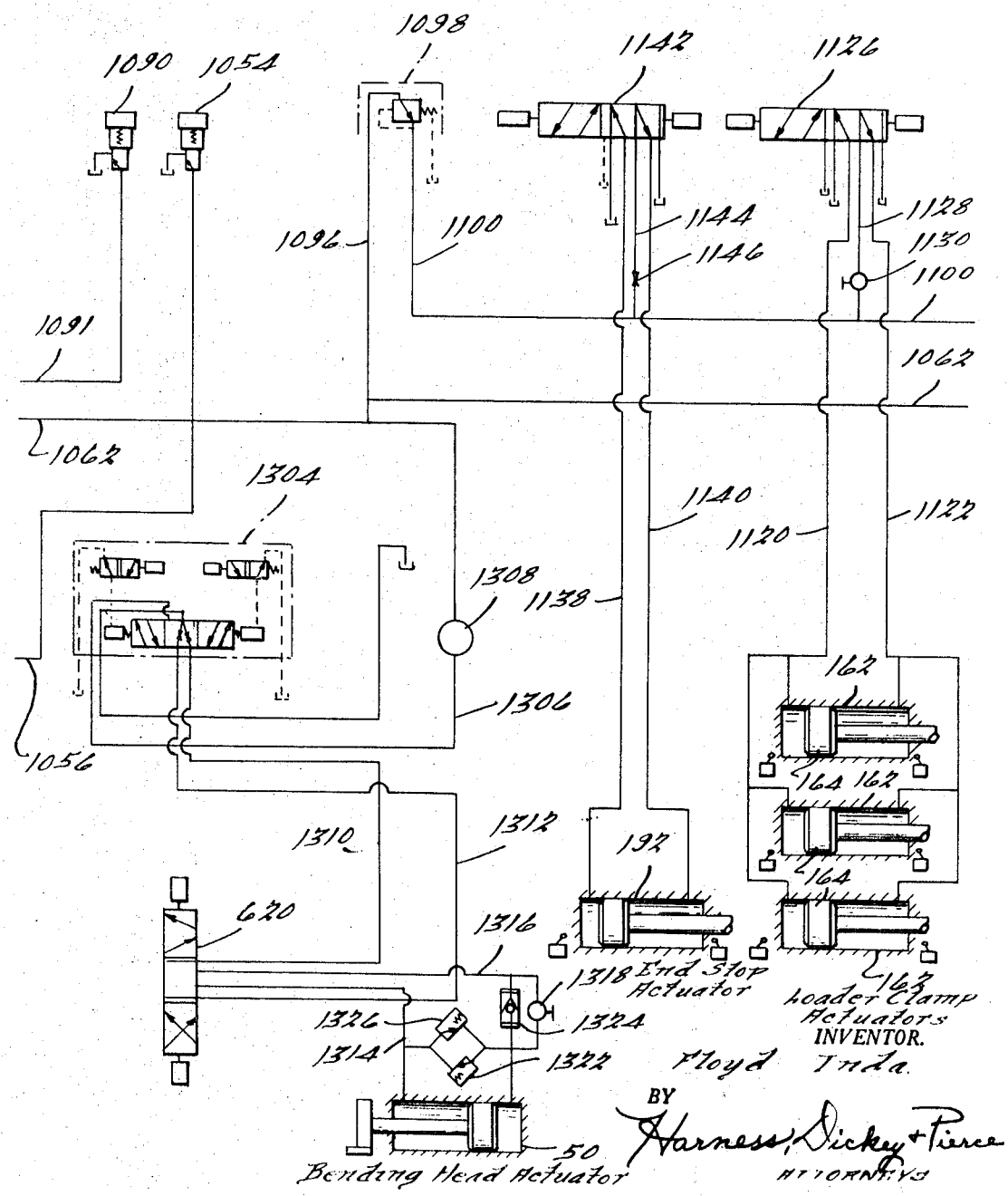

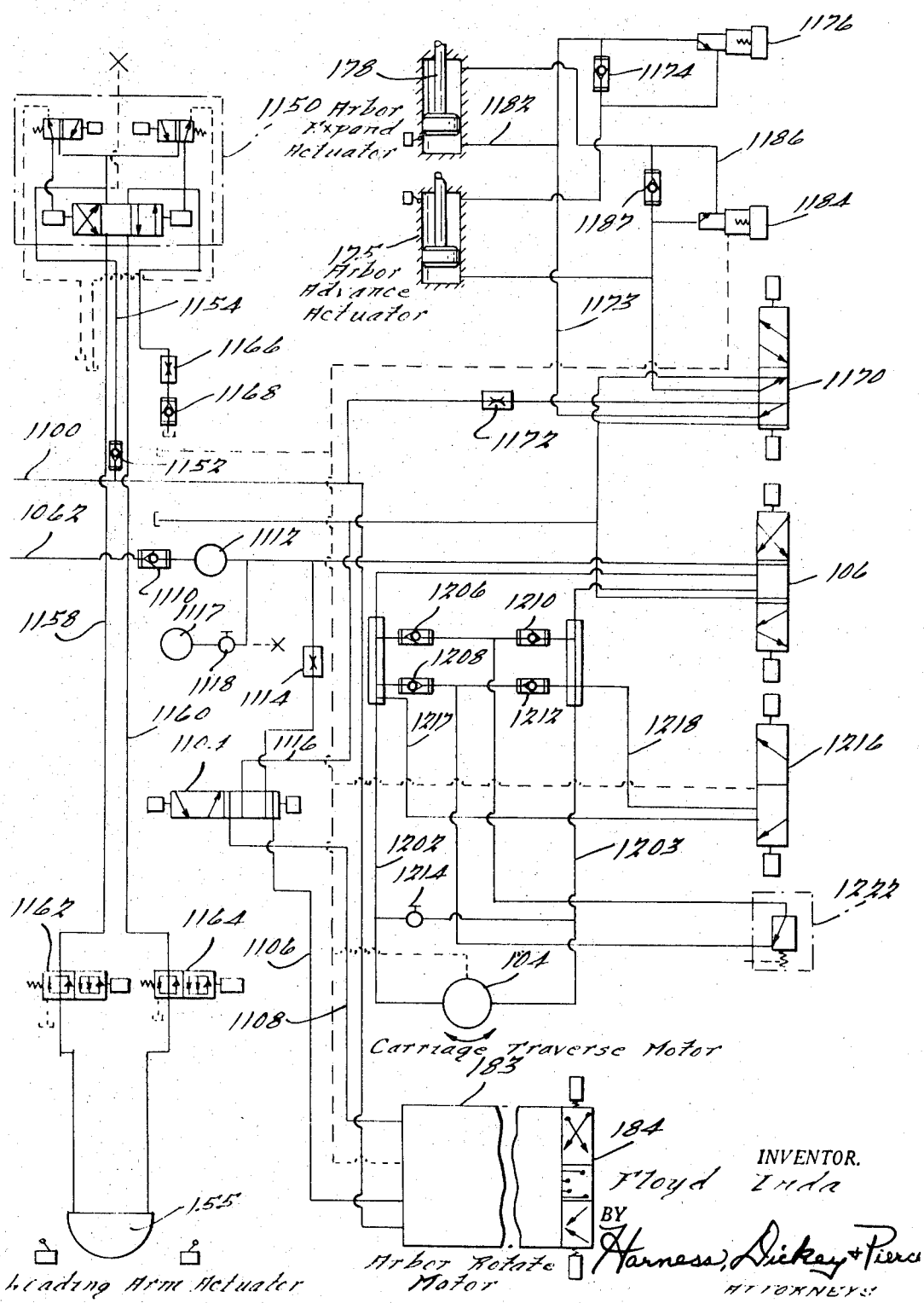

United States Patent Office 3,557,585
Patented Jan. 26, 1971

3,557,585
METHOD OF BENDING PIPE
Floyd Inda, Racine, Wis., assignor, by mesne assignments, to Tenneco Inc., Houston, Tex., a corporation of Delaware
Original application Sept. 1, 1960, Ser. No. 53,407, now Patent No. 3,426,562. Divided and this application Nov. 6, 1967, Ser. No. 680,641
Int. Cl. B21d 7/12, 7/04
U.S. Cl. 72—7                               3 Claims

ABSTRACT OF THE DISCLOSURE

The bending method of this invention utilizes loading mechanism for the acceptance of lengths of metal tube, a tube feed mechanism for positioning the tube axially and rotatively with respect to the bending head, a bending head to form the desired bends in the tube, and a numerical control system for controlling the tube feed mechanism and bending head to bend the tube at the axial and rotative position and to any desired angle of bend dictated by the numerical input intelligence. After each bend is accomplished, the tube is axially advanced to the position of the next bend, and rotated if necessary, by the feed mechanism the sequence being repeated for any desired number of bends. After the tube is moved through the machine by the feed mechanism and the desired bends are completed, the feed mechanism ejects the tube and indexes to an initial position for the acceptance of the next tube from the loading mechanism. Suitable electrical and hydraulic controls, auxiliary to the numerical control system, provide for automatic operation of functions not requiring numerical control.

RELATED APPLICATIONS

This application is a division of Ser. No. 53,407 filed Sept. 1, 1960, now Pat. No. 3,426,562.

BACKGROUND OF THE INVENTION

One particular application of the present invention is in the bending of tailpipes for automotive use. A conventional automobile tailpipe comprises a long section of tubing with many irregular bends so placed and oriented that the tailpipe fits properly beneath the frame of an automobile. Obviously, since a tailpipe is a rigid tubular member, no one tailpipe can fit every make or model of automobile. As a practical matter, each particular model of each make of automobile has a different tailpipe. Thus, a manufacturer specializing in the manufacturing and sale of tailpipes must be prepared to make and stock a prohibitive number of tailpipes differing in length, in the number and angle of bends, in the location of various bends, and in diameter.

There has long been a need for an automatic way of bending any particular type of tailpipe in any quantity desired without requiring the long setup time inherent in equipment heretofore known and used. Automatically controlled bending would make it possible to drastically reduce inventories of tailpipes and make it necessary to stock only relatively small quantities of each tailpipe configuration along with suitable quantities of straight tubing of various diameters which could be cut to length and bent as orders for either original equipment or replacement parts are received by the manufacturer.

With the rapid development and use of numerical control systems in recent years, in related machine tool fields as well as in other fields, it has become practical to use a numerical control system for the reception and translation of pertinent data relating to the location of each bend, the angle of each bend, and the radial plane of each bend thereby to automatically control the bending of a pipe so as to feed a straight length of tubing into a bending head in such a manner that the desired bends would be automatically placed in the tube.

A principal drawback to the actual development of an automated bending machine has been the lack of a concept of bending that was capable of integration with an automatic system in such a way that the bends are remotely controlled, yet the required clearances and movements are provided so that the tailpipe can be indexed from one bend to another and removed after the bending operation has been completed.

The bending concept of the present invention solves many of the problems heretofore associated with bending a metal tube at successive positions axially of the tube, to various angles, and in various angularly related planes by effecting the bends without requiring removal of the tube from the machine.

BRIEF SUMMARY OF THE INVENTION

The present bending concept features a method of holding and bending pipe that is particularly adapted to automatic control and which effects each bend by mutually complementary rolling, wiping and ramming actions. This method utilizes an actuator for the advancement of a ram die against the tube between fixed and movable wing dies, the actuator, ram die, and movable wind die being mounted on a rotatable table. The bias of the ram die against the tube effects concurrent rotation of the table, and therefore the ram die and the movable wing die, with respect to the fixed wing die and rotation of the movable wing die with respect to the ram die and table. This novel relationship of relatively rotating components results in the aforementioned simultaneous ramming, rolling, and wiping actions. Only one end of the tube is required to be supported which is the optimum condition for the application of an automatic control system to control the positioning of the tube with respect to the relatively rotating components of the bending head.

Automated control of the application of bending forces is effected by a numerical positioning control system that functions in an exemplary constructed embodiment, to translate digital intelligence into analogue commands for machine operation. The numerical intelligence input is coordinated with suitable auxiliary function inputs from, for example, conventional limit switches and push buttons, so as to provide an automatic cycle through the full bending sequence and to recycle upon termination of the sequence. The numerical control system is supplied with information as to the axial position of the tube, rotational position of the tube, and angular position of the bending head by suitable position feedback transducers. When the tube is in a position other than the position dictated by the input intelligence, as sensed by a feedback transducer, the resultant error voltage effects energization of a servo drive for the appropriate function to effect either axial movement of the tube, rotation of the tube, energization of the bending head, or any sequential combination thereof. Energization of the bending head effects control of the angle of bend because of the direct relationship between the rotational position of the ram die table, and respective dies of a bending head to the degree of energization of the hydraulic ram die actuator, as will be discussed.

The control system includes a data or intelligence source of a known type which may comprise, for example, punched cards, punched tape, of manual set decade switches. Punched cards and tape require card and tape readers, respectively, whereas decade switches may be directly connected to the control system. The aforementioned intelligence inputs are connected to a director including an auxiliary function input. The director converts digital intelligence from the data input into analogue commands for energization of suitable servo valves. Any error voltage between a command voltage and feedback voltage is analyzed to determine the amount and direction of position error, whereupon a signal is transmitted to an appropriate valve excitation amplifier and servo valve to reposition the component of the bending machine at a speed proportional to the amount of error and in a direction indicated by the sense of the error voltage.

A bending sequence is initiated by placing a tube in the jaws of a loading mechanism for transfer to a position where the tube is engaged by a tube feed mechanism. The feed mechanism advances the tube axially with respect to a bending head to a position defined by a tube index stop. Thereafter the tube is advanced axially with respect to the bending head to a position dictated by the input intelligence whereupon the bending head is energized to effect a bend in the tube.

Bending is accomplished by drawing a ram die against the tube at the midpoint between a fixed wing die and a movable wing die. Continued movement of the ram die toward the wing die causes the table for the actuator, ram die, and movable wing die to rotate with respect to the fixed wing die, causing the tube to be simultaneously rolled, rammed and wiped around the ram die. The movable wing die rotates with respect to the table concurrently with rotation of the table with respect to the fixed wing die.

After the tube is bent to a desired angle, as dictated and sensed by the numerical control system, the ram die is displaced laterally with respect to the table to clear the bent tube whereupon the ram die, table, and rotatable wing die return to an index position. When the rotatable wing die is in the index position, the feed mechanism advances the tube axially to the position of the next bend. If desired, the feed mechanism rotates the tube, as dictated by the numerical intelligence, to effect the next bend in a radial plane angularly related to the previous bend. This sequence is repeated for any desired number of bends that may be preset on the punched tape, punched cards, or manually set up on the decade switches.

Thus, the invention provides an automated method for automatically bending a tube at any desired axial position, any desired radial plane, to any desired angle by a combination of rolling, wiping, and ramming or pressing actions or forces on the tube.

DESCRIPTION OF THE DRAWINGS

FIG. 1 is a side elevational view of an automatic tube bending machine in accordance with an exemplary embodiment of the present invention;

FIG. 2 is a top view of the bending machine of FIG. 1;

FIG. 3 is an end view of the bending machine of FIG. 1 showing the loading mechanism thereof in the tube receiving position, enlarged for clarity;

FIG. 4 is an end view of the bending machine similar to FIG. 3 showing the loading mechanism in the feed position;

FIG. 5 is a fragmentary top view, partially in section, of a bending head shown in an index position;

FIG. 6 is an end view of the bending head of FIG. 5;

FIG. 7 is a view similar to FIG. 5 of the bending head after completion of a 90° bend in the tubing;

FIG. 8 is a view similar to FIG. 7 after completion of a 180° bend in the tube;

FIG. 9 is a fragmentary cross-sectional view taken substantially along the line 9—9 of FIG. 6;

FIG. 10 is a fragmentary end view of the bending machine showing the end stop and operating cylinder therefor;

FIG. 11 is a fragmentary end view of the feed mechanism carriage;

FIG. 12 is a fragmentary side view of the feed mechanism arbor head;

FIG. 13 is a diagrammatic numerical control circuit for the bending machine;

FIG. 14 is a diagrammatic hydraulic control circuit for the bending machine;

FIG. 15 is a diagrammatic hydraulic control circuit supplementary to FIG. 14; and FIG. 16 is a diagrammatic hydraulic control circuit supplementary to the FIGS. 14 and 15.

DESCRIPTION OF THE INVENTION

A bending machine 20 (FIGS. 1 and 2), in accordance with an exemplary embodiment of the present invention as claimed in parent application Ser. No. 53,407, comprises a loading mechanism 22 (FIGS. 3 and 4), for the acceptance of lengths of metal tube 40, a tube feed mechanism 24 for positioning the tube 40 at a desired axial and rotative position, and a bending head 30 for effecting bends in the tube 40. The feed mechanism 24 and bending head 30 are energized and controlled by a numerical control system 32. (FIG. 13).

The tube 40, after being cut to proper length, is placed in three aligned pairs of jaws 42 and 43 of the loading mechanism 22 (FIGS. 3 and 4). The aligned pairs of jaws 42 and 43 are supported by three loading arms 44 which, upon rotation of a common support shaft 45, pivot upwardly to carry the tube 40 to a position above the machine 20 (FIG. 4) where it is picked up by the tube feed mechanism 24. After the feed mechanism 24 engages the tube 40, in a manner to be described, the tube 40 is advanced and rotated with respect to bending head 30 to an axial and rotative position dictated by suitable numerical input intelligence to the control system 32. When the tube 40 is in a desired axial and rotative position, the bending head 30 effects a bend in the tube 40 to an angle dictated by the input intelligence to the control system 32.

Bending is accomplished by means of a hydraulic actuator 50 (FIG. 5) which draws a ram die 52 against the tube 40, engaging the tube 40 at the midpoint between a fixed wing die 56, which is rigidly suported by a frame 60 of the machine and a movable wing die 62. Continued movement of the ram die 52 towards the tube 40 and wing dies 56 and 62 (FIG. 7) causes a table 64 for the actuator 50, ram die 52, and movable wing die 62 to rotate about the pivotal support for the table 64 on the frame 60 with respect to the fixed wing die 56 thereby causing the tube to be simultaneously rolled, rammed and wiped around the ram die 52. It is to be noted that the movable wing die 62 rotates with respect to the table 64 concomitantly with rotation of the table 64 with respect to the frame 60.

When the tube 40 is bent to a desired angle, the ram die 52 is displaced laterally with respect to the table 64 to clear the bent tube 40 whereupon the ram die 52, carriage 64 and rotatable wing die 62 return to their index position (FIG. 5). When the bending head 30 is in the index position, the feed mechanism 24 advances the tube 40 to the position of the next bend. If desired, the feed mechanism 24 rotates the tube 40 to effect the next bend in a radial plane angularly related to the previous bend. When all the bends have been completed, the feed mechanism 24 advances the tube 40 to an eject position whereupon the tube is ejected onto a suitable conveyor or storage device (not shown). The feed mechanism 24 then returns to an index position for the reception of another tube 40.

The frame 60, for the support of the aforementioned components, comprises a pair of spaced parallel machine ways 70 and 72. The feed mechanism 24, comprising a carriage 74, is movable longitudinally of the frame 60 on the ways 70 and 72. The frame 60 has a plurality of upstanding legs 76 and lateral members 80 for the support of the parallel ways 70 and 72 and may be, for example, either a unitary castings or a weldment. The bending head 30, which will be described in detail hereinafter, is supported at one end 81 of the frame 60 (FIGS. 1 and 2).

The carriage 74 is supported for movement longitudinally of the frame 60 by two pairs of rollers 90 and 92, on opposite sides thereof, that are rollable along the ways 70 and 72, respectively. The carriage 74 is driven longitudinally of the frame 60 by a drive comprising a rack 100 and gear 102. The gear 102 is driven by a suitable piston type hydraulic motor 104 on the carriage 74 that is energized and controlled by a servo valve 106, as will be described.

A suitable longitudinal position feedback transducer 110, for example, a transducer manufactured by the W. F. & John Barnes Company, Rockford, Ill., extends along the frame 60, a sensing head 112 thereof being supported by the carriage 74 for movement therewith relative to the element 110 thereby to feed back the physical position of the carriage 74 with respect to the frame 60 and bending head 30.

LOADING

The loading mechanism 22 (FIGS. 3 and 4) comprises the three loading arms 44 which are of generally U-shaped configuration and are supported for rotation with respect to the frame 60 at the lower ends 150 thereof, respectively, by the longitudinally extending drive shaft 45. The shaft 45 is supported for rotation by a plurality of bearings 154 and is rotated by a hydraulic motor 155 (FIG. 2) to pivot the upper ends 156 of the arms 44 from a loading position (FIG. 3) to a position above the machine 20 in alignment with the feed mechanism 24 (FIG. 4). Suitable limit switches 157 and 158 are engageable with a cam 159 on the shaft 45 to control energization and deenergization of the motor 155 and to initiate other functions in the bending sequence upon positioning the tube 40 in alignment with the feed mechanism 24.

The upper end 156 of each loading arm 44 is provided with a tube gripping mechanism 160, respectively, comprising a hydraulic actuator 162 having a piston 164 that is secured to the pivoted upper jaw 42 of the gripping mechanism 160, reciprocation of the piston 164 acting to open and close the jaws by moving the jaw 42 up about its pivot. The lower jaw 43 is rigidly supported by the end portion 156 of the loading arm 44. The jaws 42 and 43 are provided with pairs of rollers 172 and 174, respectively, of truncated conical cross section so as to define a V-shaped way to facilitate gripping of the tube 40 therebetween upon energization of the hydraulic actuators 162 to close the jaws.

TUBE FEED

The tube feed mechanism 24 (FIGS. 1, 2, 11 and 12) comprises the carriage 74 having support rollers 90 and 92 thereon for engagement with the ways 70 and 72 of the frame 60, respectively. Movement of the carriage 74 longitudinally of the ways 70 and 72 is effected by the drive gear 102 that is engageable with the longitudinally extending rack 100 surmounting the way 72. The drive motor 104 is suitably mounted on the carriage 74 and effects rotation of the gear 102 through a suitable gear train (not shown), rotation of the drive motor 104 being controlled by the servo valve 106 which, in turn, is responsive to the numerical control system 32. The longitudinal position of the carriage 74 on the ways 70 and 72 is sensed by the longitudinally extending feedback transducer 110 in cooperation with the sensing head 112 thereof.

After the loading mechanism 22 positions the tube 40 in alignment with the tube feed mechanism 24, the tube feed mechanism 24 is energized to engage the tube 40 for the purpose of supporting the tube 40 for axial movement and rotation. The tube feed mechanism comprises an arbor head 120 having an expandable arbor 122 at one end thereof, for example, an Ericson expanding arbor, that is enclosed within an elongated sleeve 123, the sleeve 123 being fixedly supported by the carriage 74. The arbor 122 is acceptable within the tube 40 and expandable radially outwardly to grip the tube 40 for rotation and axial movement with respect to the bending head 30.

The arbor head 120 is supported for movement with respect to the carriage 74 on a pair of spaced tubular ways 176 and 177, movement along the ways being effected by appropriate energization of a hydraulic piston and cylinder unit 175. Advancement of the arbor head 120 with respect to the carriage 74 biases the arbor 122 thereof into the open end portion of the tube 40 thereby to condition the arbor 122 for expansion.

Gripping of the tube 40 is initiated by forward movement of the carriage 74 to engage the sleeve 123 of the feed mechanism 24 with the end of the tube 40. The sleeve 123 preferably is of the same diameter as the tube 40 to facilitate such engagement. Further movement of the carriage 74 and sleeve 123 biases the tube 40 against a retractable end stop 126 (FIGS. 1 and 10), on the opposite end of the frame 60. Engagement of the tube 40 with the stop 126 defines a longitudinal index position for the tube 40. Upon the receipt of a suitable signal from an auxiliary input to the control system 32, for example, a limit switch on the end stop 126 (not shown), the hydraulic piston and cylinder unit 175 is energized to advance the arbor head 120 and arbor 122 into the open end of the tube 40. Thereafter, a hydraulic piston and cylinder unit 178 is energized to expand the arbor 122 to grip the internal surface of the tube 40 thereby to positively hold the tube 40 for movement longitudinally of the frame 60 and for rotation to any desired angular position with respect to the bending head 30. Expansion of the arbor 122 is accomplished by an operating rod 179 of the hydraulic unit 178 that extends longitudinally through the arbor head 120 so as to be engageable with the expandable arbor 122 to effect expansion thereof through axial movement of a conventional cone expander.

The end stop actuator 126, against which the tube 40 is biased after engagement by the sleeve 123, is controlled by an end stop hydraulic piston and cylinder unit 192 (FIG. 10). The end stop actuator unit 192 has a piston or operating rod 193 engageable with an arm 194 to effect rotation of the arm 194 about a pivot 195. The arm 194 has an outer end portion 196 that is swingable into alignment with an aperture 197 in a tube guide 198 through which the tube 40 extends and is supported in proper position with respect to the bending head 30. The tube guide 198 depends from an overlying portion of the frame 60. Suitable limit switches 199 and 200 are actuated when the operating rod 193 reaches an upper and lower position, respectively, for control of the actuator unit 192 and to initiate other functions of the machine 20.

After expansion of the arbor 122 to engage the tube 40, the carriage 74, arbor head 120, arbor 122 and tube 40 move longitudinally of the frame 60 as a unit under drive of the motor 104 as controlled by the servo valve 106 and control system 32.

The arbor 122 is mounted on the outer end of a rotatable arbor drive shaft 180 that is rotated by a worm 181 and gear 182. The worm 181 is driven through suitable couplings by a rotary hydraulic motor 183 that is energized through a servo valve 184.

A feedback transducer 186 (FIG. 12) such as an Atcotran transducer manufactured by the Automatic Timing and Control Company, is supported by the carriage 74 for sensing rotation of the arbor shaft 180, arbor 122 and tube 40. The transducer 186 has an element 187 that is movable axially thereof upon rotation of the arbor drive shaft 180 due to, for example, movement of a pin 188 within a helical groove 189 in the drive shaft 180 to give positive indication of the rotational position of the arbor 122 and therefore of the tube 40.

BENDING HEAD

The bending head 30 is located at the end 81 of the frame 60, only one component thereof, namely, the fixed wing die 56 being rigidly affixed to the frame 60, the remainder of the components being supported on the rotatable table 64. The table 64 is mounted for rotation with respect to the frame 60 by a vertically disposed pivot pin or shaft 202 the axis of which lies in a vertical plane extending through the longitudinal axis of the unbent portion of the tube 40. As will be discussed, the fixed wing die 56 is removably secured to the end portion 81 of the frame 60 so that dies of varying length and groove radii can be interchanged to facilitate bending of various diameter tubes at varying bend radii.

As best seen in FIGS. 5, 7 and 8, the movable wing die 62 is rotatable about the central axis of a vertically oriented shaft 308 that is supported by the table 64. The shaft 308 is vertically aligned with the shaft 202, its primary function being to support the movable wing die 62 for rotation relative to the table 64.

The ram die 52 is movable with respect to the table 64 towards and away from a plane drawn through the central axes of the shafts 202 and 308. Such movement of the ram die 52 effects concomitant rotation of the table 64 about the shaft 202, rotation of the movable wing die 62 about the axis of the shaft 308 and bending of the tube 40. The ram die 52 is drawn toward the aforementioned plane upon energization of the hydraulic cylinder 50, the degree of energization controlling the extent of linear movement of the ram die 52 and thereby controlling both the aforementioned angles through which the table 64 and movable wind die 62 rotate and the angle of bend in the tube 40.

Referring now to FIG. 9, the table 64 is supported for rotation with respect to the frame 60 by the vertically orientated shaft 202. The shaft 202 extends through a plurality of apertures 204, 206, 208 and 210 in a like plurality of horizontally extending support flanges 214, 216, 218 and 220 on the frame 60 of the machine 20. The shaft 202 also extends through a pair of aligned vertical bores 243 and 244 in a pair of horizontally extending flanges 245 and 246 on the table 64 thereby to support the table 64 for rotation with respect to the frame 60. It is to be noted that the shaft 202 is pinned to the flanges 245 and 246 of the table 64 thereby requiring that the shaft 202 rotates with the table 64 within the apertures 204, 206, 208 and 210 in the horizontally extending flanges 214, 216, 218 and 220, respectively, on the frame 60. The shaft 202 also extends through a plurality of vertically aligned apertures 230 and 232 in the upper and lower legs 234 and 236, respectively, of a U-shaped face plate support 240. The U-shaped vertical cross section of the face plate 240 is defined by the legs 234 and 236 in conjunction with a vertically extending bight portion 242 (FIG. 5). The face plate support 240, in conjunction with a second face plate support 350, supports a face plate 370 that is secured to the ram or piston 390 of the hydraulic actuator 50 by a plurality of bolts 384.

Rotation of the table 64 with respect to the frame 60 is restrained by a rotary oscillating hydraulic torque actuator 256, for example, an actuator having the trade name ROTAC and manufactured by the Excello Corporation, Detroit, Mich. Rotation of the table 64 is restrained by an upper end portion 252 of an output shaft 254 of the actuator 256 that is keyed to a transverse support member 260 on the frame 60 as by a pin 262. The shaft 254 extends downwardly through an aperture 264 in a flange 266 extending horizontally from the table 64. Therefore, because the housing of the torque actuator 256 is affixed to the table 64, relative movement of the table 64 with respect to the frame 60 is restrained by hydraulic pressure within the actuator 256.

The lower end portion 250 of the table 64 is supported for rotation with respect to the frame 60 by a support shaft 270 that is disposed in a vertical bore 272 in a transverse shaft support flange 274 on the machine frame 60. The shaft 270 extends upwardly into a bore 276 in a horizontal flange 278 of the table 64. The shaft 270 is aligned with both the shaft 254 of the torque actuator 256 and the upper support shaft 202 thereby to facilitate rotation of the table 64 about the common central axis thereof.

Because the shaft 202 is pinned to the flanges 245 and 246 of the table 64 by the plurality of pins 280, a cam 282 on the lower end of the shaft 202 is also rotatable with the table 64 to give, in conjunction with a suitable feedback transducer 284, positive indication of the rotational position of the table 64. The transducer 284 is affixed to the frame 60 and has a cam follower 286 thereon engageable with the cam 282.

As discussed hereinbefore, the fixed wing die 56 (FIG. 5) is removably secured to the uppermost transverse flange 220 of the frame 60, as by any suitable means, for example machine screws (not shown), so that die faces of varying arcuate radius can be employed for the acceptance and bending of tubing of various diameters.

A movable wing die support clevis 300 (FIG. 9) having a plurality of aligned apertures 302, 303 and 304 in a like plurality of transverse flanges 305, 306 and 307 is supported by the vertically extending shaft 308 for rotation with respect to the table 64. The rotatable wing die 62 is removably secured to the upper end of the clevis 300 as by bolts (not shown) so as to be rotatable therewith. The lower end of the shaft 308 has a radial flange 310 to position the clevis 300 axially thereof.

The shaft 308 is keyed to the clevis 300 as by a plurality of pins 312 and to an upper end 314 of an output shaft 316 of a rotary oscillating torque actuator 320, for example, a ROTAC, as by a pin 321. The housing of the torque actuator 320 is affixed to a vertical support plate 330 that has upper and lower end portions 331 and 332 adjustably secured to the table 64 as by a pair of ways 333 and 334, respectively. Therefore, rotation of the movable wing die 62 relative to the table 64 is restrained by the torque actuator 320, the amount of restraint being determined by hydraulic pressure applied to the actuator 320. The support plate 330 has a horizontal flange 335 with a bore 336 therein for the support of the shaft 316. Therefore, upon adjustment of the face plate support 350 transversely of the table 64, the plate 330, torque actuator 320, shaft 308, clevis 300, and rotatable wing die 62 move transversely thereof.

As best seen in FIG. 6, the face plate support 350 is of generally U-shaped configuration defined by a pair of horizontally extending leg portions 352 and 354 and a bight portion 356. The leg portions 352 and 354 have suitable apertures 358 and 360 therein, respectively, for the acceptance of the shaft 308. Therefore, the support plate 350 is movable laterally of the table 64 with the shaft 308, as will be discussed.

As best seen in FIGS. 5 and 6, the bight portions 242 and 356 of the face plate supports 240 and 350, respectively, have a pair of spaced aligned ways 361 and 362 thereon for the support of the face plate 370. The face plate 370 has a suitable aperture 371 for the passage of a pair of actuator extensions 380 and 382 that are fixedly secured to the housing 383 of the hydraulic actuator 50 and to a ram die slide 510 as by a plurality of bolts 512. Because the piston 390 of the actuator 50 is rigidly affixed to the face plate 370 as by a plurality of bolts 384, energization of the hydraulic actuator 50 effects relative movement between the housing 383 of the actuator 50 and the face plate 370, the actuator extensions 380 and 382 passing through the apertures 371 and effecting movement of the ram die slide 510 and ram die 52.

Adjustment of the bending head 30 to effect bends of different radius is accomplished by varying the spacing between the central axes of the shafts 202 and 308. The face plate supports 240 and 350 have oppositely threaded transverse bores 400 and 402 therein for the acceptance of an adjustment screw 404, opposite end portions 406 and 408 of which are provided with threads of equal but opposite lead. A center portion 409 of the rod 404 is keyed to a portion 410 of the face plate 370 so that, upon rotation of the screw 404, the face plate 370, the actuator 50, a ram die slide 510 and ram die 52 move laterally with respect to the shaft 202 and fixed wing die 56. The shaft 308 and its appended components, including the torque actuator 320 and movable wing die 62 also move laterally with respect to the shaft 202, twice the distance of movement of the face plate 370, actuator 50, ram die slide 510 and ram die 52.

As best seen in FIG. 6, the table 64 has an upper surface 500 with a pair of parallel ways 502 and 504 thereon (FIG. 5) for the acceptance of the ram die slide 510. The ram die slide 510 is movable on the ways 502 and 504 to support the ram die 52 for movement against the tube 40 under the bias of the actuator 50. The slide 510 is rigidly affixed to the extensions 380 and 382 of the actuator 50 as by a pair of screws 512 so as to be movable therewith. Therefore energization of the actuator 50 effects movement of the actuator housing 383, extensions 380 and 382, slide 510, and ram die 52 to the left, as seen in the drawings, against the tube 40.

The slide 510 is provided with a pair of spaced, parallel transversely extending ways 520 and 522 for the acceptance of a ram die carrier 530. The ram die carrier 530 is movable transversely of the slide 510 under the bias of a hydraulic cylinder and piston actuator unit 532, one end 534 (FIG. 5) of which is affixed to the slide 510 and the other end 536 of which is affixed to the carrier 530. Lateral movement of the ram die 52 is required to clear the die 52 from the tube 40 upon completion of a bend.

The ram die 52 is secured to the carriage 530 as by a plurality of bolts 538, that permit the die 52 to be removed for the purpose of interchanging dies of various sizes to effect bends of varying radius or to accept tubes of different diameter. Each ram die 52 is of semicircular construction having a peripheral arcuate groove 540 complementary to the tube 40 being bent.

Operation of the bending head 30 is best understood when it is realized that the piston 390 of the hydraulic unit 50 is rigidly secured to the face plate 370 of the table 64 and that when fluid under pressure is admitted to the actuator 50, the housing 383 and its rigid extensions 380 and 382 move to the left as seen in FIG. 5. Movement of the housing 383 of the actuator 50 to the left pulls the slide 510 and attached ram die 52 toward the tubing 40 which has been properly positioned by the feed mechanism 24 in the aligned semicircular recesses in the wing dies 56 and 62. When contact is made between the ram die 52 and the tubing 40, resistance is presented to further movement of the ram die 52. This resistance is provided by the tube 40 and by the ROTAC units 256 and 320. The latter resistance can be varied or controlled to provide the proper degree of resistance to effect bends without distortion or deformation of the wall of the tube 40. The unit 256 is preferably set to provide somewhat more resistance than the unit 320 so that the wing die 62 lags behind in terms of angular rotation.

Upon movement of the ram die 52, against the tube 40, the table 64 pivots about the shafts 202 and 270 and torque actuator shaft 254. It is to be noted that the ram die 52 acts against the tube 40 at a point spaced from the central axis of the aforementioned shafts thereby to effect rotation of the table 64. The movable wing die 62 also rotates with respect to the table 64 under the bias of the ram die 52. When the table 64 rotates 45 degrees and 90 degrees, the ram die 52, wing dies 56 and 62, and tube 40 are in the relative positions shown in FIG. 7 and FIG. 8, respectively.

Adjustment of the bending head 30 to change the radius of bend is accomplished by changing and repositioning the wing dies 56 and 62 and ram head die 52. In accordance with the principle of operation of the bending head 30, the center line of the ram die 52 must always be centered halfway between the pivotal axes of the table 64 and movable wing die 62, or, in other words, the central axes of the shafts 202 and 308. Also, the diameter of the ram die 52, which dictates the radius of bend, must be substantially equal to the aforementioned spacing. Therefore, relatively smaller radii bends require a closer spacing of the axes of the shafts 202 and 308.

To accommodate ram dies of varying diameter, the center line of the hydraulic actuator 50 and ram die 52 is adjustable laterally by the screw 404 relative to the fixed wing die 56. Because the center portion 409 of the screw 404 is coupled to the face plate 370, the center of the face plate 370 is always half-way between the ends of the screw 404 and therefore midway between the axes of the shafts 202 and 308. In order to change the radius of bend, the screw 404 is advanced or retracted until the axes of the shafts 202 and 308 are spaced apart approximately twice the radius of bend desired, which of course, is equal to the diameter of the ram die 52. Preferably, the length of the wing dies 56 and 62 is such that when the wing dies 56 and 62 are aligned in the index position (FIG. 5), they will be spaced apart approximately .0625 inch.

It is to be noted that rotation of the screw 404 also effects transverse movement of the hydraulic torque actuator 320, which is secured to the shaft 308 of the movable wing die. This is required because the shaft 308 of the movable wing die 62 and the torque actuator 320 must be aligned for common rotation.

When the diameter of the tube is changed, the wing dies 56 and 62 and ram die 52 must be changed in order that the concave recesses therein are complementary to the diameter of the tube being bent. In this manner, the machine 20 can be adjusted to bend tubes of any desired diameter at a desired radius.

It is to be emphasized that rotation of the table 64 and therefore the angle of bend in the tube 40 is dictated by the amount of movement of the ram die 52. This movement is in turn controlled by the level of energization of the hydraulic actuator 50. Because movement of the ram die 52 is directly translated into rotation of the table 64, sensing of the rotational position of the table 64, as by the transducer 284 reflects the angle of bend in the tube 40. Because the transducer 284 ultimately controls energization of the actuator 50, the feed-back loop is complete.

NUMERICAL CONTROL

The numerical control system 32 (FIG. 13) translates digital intelligence into analogue commands for control of the bending machine 20. The control system 32 is conventional insofar as the components thereof are concerned, which are, for example, standard components sold by the General Electric Company. The control system 32 comprises a data or intelligence input section comprising, for example, punched cards 600, punched tape 602, or a collection of manually set decade switches 604. The input data comprises numerical information as to the axial position, radial plane, and angle of each bend. The punched cards 600 and tape 602 require card and tape readers 606 and 608 respectively whereas the decade switches 604 may be directly connected into the director of the control system 32. The tape reader 608 also requires a decoder 609. Each of the aforementioned inputs is connected to the director comprising a distributor 610, a command voltage generator 612, and an auxiliary function input 614. The auxiliary function input 614 provides for the control of machine movements not requiring numerical control, for example, through connection with various limit switches, as is well known.

The director section of the control system 32 converts the digital intelligence from the data input section into analogue commands for energization of a plurality of valve excitation amplifiers 615, 616, and 618 for the servo valve 620 which controls the bending operation of the actuator 50, for the servo valve 106 controlling the axial feed provided by the hydraulic motor 104, and for the servo valve 184 controlling the pipe rotation as provided by the hydraulic motor 183, respectively.

The numerical control system 32 is supplied with information as to the axial position of the tube 40, rotational position of the tube 40, and angular position of the bending head 30 by the position feedback transducers 110, 186, and 284, respectively. When a tube 40 is in a position other than the position dictated by the input intelligence, the servo valve for the apropriate function is energized to effect axial movement of the tube 40 by the motor 104, rotation of the tube 40 by the motor 183, or energization of the bending head actuator 50. Energization of the bending head actuator 50 effects control of the angle of bend of the tube 40 because the relative position of the dies 52, 56, and 62 of the head 30 and therefore the angle of bend is controlled by the position, and therefore the degree of energization, of the hydraulic actuator 50, i.e., how far the cylinder 50 moves away from the face plate 370.

HYDRAULIC SYSTEM

Turning now to a more detailed description of the hydraulic control system of the bending machine of the present invention, a hydraulic pump 1000 (FIGS. 14, 15 and 16) for example, a 35 g.p.m. variable volume pressure compensated piston pump, is driven by an electric motor 1002, for example, a 60 h.p., 1200 r.p.m. motor. A hydraulic pump 1004, for example, a gear pump having a 3 g.p.m. 1800 r.p.m. first section and a 5 g.p.m. 1800 second section, is driven by, for example, a 1 h.p. 1800 r.p.m. motor 1006. Suitable filters 1008 and 1010 are provided for the pumps 1000 and 1004, respectively. A suitable heat exchanger 1012 is connected through an orifice 1014, for example, an eight-gallon per minute 15 p.s.i. pressure drop orifice to a reservoir 1016. A by-pass pressure relief valve 1018 is connected to the pressure side of the pump 1004 through a line 1020, the valve 1018 being adjustable between the ranges of 100 to 500 p.s.i., a normal setting being, for example, 100 p.s.i.

The pump 1004 is connected through a line 1022 to the movable wing die torque actuator 320 which is connected to the movable wing die 62 as discussed hereinbefore. The motor 320 is connected, through a paralleled check valve 1026 and needle valve 1028, to a check valve 1030 through a conduit 1032. The check valve 1030 is connected to a four way two-position spring offset directional control valve 1034 for controlling return of the bending head 30 to the index position shown in FIG. 5. The movable wing die torque actuator 320 preferably lags behind the actuator 256 to facilitate clearing of the tube 40.

The bending head table torque actuator 256 is connected to the pump 1004 through the line 1022 and a paralleled check valve 1042 and mechanically actuated speed control needle valve 1044. The other side of the torque actuator 256 is connected through a paralleled needle valve 1046 and check valve 1048 to one input of a four-way two-position detented valve 1050. A safety overload valve 1052 is provided for the valve 1050. A safety overload valve 1054, for example, a valve that is adjustable within the range of 100 to 1500 p.s.i., is branch connected to the line 1032 by a line 1056.

The hydraulic pump 1000 is connected to a pressure relief valve 1060 through a main conduit 1062 and a branch conduit 1064. A solenoid operated four way two-position spring offset valve 1066 is connected through a pressure operated reversing valve 1068 and an orifice 1070 to the pressure relief valve 1060 through a conduit 1072. The valve 1066 is connected through a conduit 1074 to an output line 1076 of a pressure reducing valve 1078 which is connected to the conduit 1062 through a line 1080.

The bending head return valve 1034 is connected through a needle valve 1082 to a three-position spring centered directional control valve 1084. The valve 1084 controls operation of the bending head cross slide actuator 532 which is, for example, a hydraulic cylinder having a one-inch bore with a 6½ inch stroke. A suitable check valve 1088 is provided for the valve 1084. A by-pass pressure relief valve 1090 that is adjustable within the range of 0 to 550 p.s.i. with a normal setting of 100 p.s.i. is connected by a conduit 1091 to a control line 1092 for the bending die cross side slide cylinder 532. A second conduit 1094 connects the valve 1084 and actuator 532.

The line 1062 from the pump 1000 is connected through a line 1096 to a pressure reducing valve 1098 that is normally set at, for example, 1000 p.s.i. The reducing valve 1098 is connected through a conduit 1100 to the pressure inlet of the arbor drive servo valve 184 and motor 183. The rotational position of the motor 183 is reflected by the transducer 186 that is connected to a feedback relationship to the rotational positional valve excitation amplifier 618 through the control system voltage generator 612. Hydraulic pressure is supplied to the servo valve 184 and motor 183 from a two-position manifold mounted valve 1104 through a line 1106. A return line 1108 is connected to the servomotor 183 and to the valve 1104. Fluid under pressure from the hydraulic pump 1000 is supplied through the conduit 1062, a check valve 1110, a filter 1112, and an adjustable flow regulator 1114 to the valve 1104. A conduit 1116 provides for return of the fluid to the tank. An accumulator 1117 is connected through a needle valve 1118 to the downstream side of the filter 1112.

Clamping of the tube 40 in the jaws 42 and 43 of the loading mechanism 22 is effected by actuation, as by a conventional manual control, of the paralleled clamp cylinders 162 (FIG. 15) for example, hydraulic cylinders having a 1½ inch bore and 3 inch stroke. The cylinders 162 are connected by conduits 1120 and 1122 to a two-position directional control valve 1126 which is connected through a line 1128 and needle valve 1130 to the conduit 1100.

The end stop actuator 192 is connected through a pair of conduits 1138 and 1140 to an end stop control valve 1142. The valve 1142 is connected to the pressure line 1100 through a conduit 1144 and orifice 1146 for example, an orifice passing one g.p.m. at 800 p.s.i.

Actuation of the loading arms 44 is controlled by a four-way three-position normally centered valve 1150 that is connected to the pressure line 1100 through a check valve 1152 by a conduit 1154. The valve 1150 is connected to the loading arm motor 155 by a pair of conduits 1158 and 1160 through a roller operated needle and check speed control valves 1162 and 1164. An adjustable flow regulator 1166 and check valve 1168 are connected to the valve 1150.

Movement of the arbor advance actuator 175 is controlled by a four way two-position detented directional control valve 1170 that is connected through a fixed flow-regulator 1172 to the high pressure line 1100. The arbor advance actuator 175 is also connected to the valve 1170 through a line 1173 and parallel check valve 1174 and a safety overload valve 676, the overload valve 1174 being adjustable between the ranges 100 and 500 p.s.i. and normally set at 200 p.s.i. The conduit 1173 from the valve 1170 is connected to the arbor expand actuator 178 through a conduit 1182 thence to a safety overload valve 1184 through a conduit 1186. A check valve 1187 is connected across the line 1186 and valve 1170.

Movement of the bending machine feed mechanism 24 is effected by the fluid motor 104 that is energized through pressure line 1202 and 1203 from an electro-hydraulic servo valve 106. The valve 106 is energized through the check valve 1110 and filter 1112 from the high pressure line 1062. A plurality of 3000 p.s.i. check valves 1206, 1208, 1210, and 1212 are connected across the fluid motor 104 as is a needle valve 1214. A three-way two-position directional valve 1216 is connected across the lines 1202 and 1203 by lines 1217 and 1218. A pressure relief valve 1222 is connected in parallel with the motor through the opposed check valve 1206–1210 and 1208–1212.

The hydraulic actuator 50 for the bending head 30 is energized through the servo valve 620 and a four-way three-position spring centered valve 1304. The valve 1304 is connected to the high pressure line 1062 by a line 1306 through a filter 1308. The valve 1304 is connected to the servo valve 1302 by a pair of conduits 1310 and 1312 and the servo valve 1302 to the actuator 50 by a pair of conduits 1314 and 1316. The conduit 1314 is connected to the conduit 1316 through a needle valve 1318 and a pair of reverse parallel by-pass valves 1320 and 1322. The conduit 1316 is connected to the actuator 50 through a check valve 1324.

BENDING SEQUENCE

A bending sequence is initiated by placing a tube 40 in the jaws 42 and 43 of the loading mechanism 22 when the loading mechanism 22 is in its lower position (FIG. 3). The paralleled hydraulic actuators 162 (FIG. 15) are then energized, as by a manually operated control (not shown) to lock the tube 40 in the jaws 42 and 43 whereupon the hydraulic actuator 155 (FIG. 16) is energized as by suitable limit switches on the jaws 42 and 43, to rotate the shaft 45 and arms 44 of the loading mechanism 22 counterclockwise, as seen in the drawings, to a position wherein the tube 40 is generally aligned with the arbor 122 (FIG. 4). Upon alignment of the tube 40 with the arbor 122 the actuator 192 (FIG. 15) is energized to move the end stop 126 into alignment with the aperture 197 in the tube guide 198.

The carriage drivemotor 104 is then energized to move the sleeve 123 on the feed mechanism 24 into engagement with the tube 40 whereupon the tube 40 is biased against the end stop 126. The hydraulic actuator unit 175 (FIG. 12) is then energized to move the arbor head 120 forwardly with respect to the feed mechanism carriage 74 thereby to insert the arbor 122 into the open end of the tube 40. Upon insertion of the arbor 122 into the tube 40 of the hydraulic actuator unit 178 is energized to expand the arbor 122 so that it securely grips the internal surface of the tube 40 for longitudinal advancement and rotation with respect to the bending head 30.

The carriage 74 and, of course, the tube 40 is then moved longitudinally along the ways 70 and 72 toward the bending head 30 by the hydraulic carriage transverse motor 104. The carriage 74 stops at a position dictated by the numerical intelligence fed into the control system 32. The position of the carriage 74 is sensed by the longitudinal position transducer 110 which feeds back an error signal to the voltage generator 612 of the director unit at such time as the carriage 74 and tube 40 are in a position other than the position dictated by the numerical input intelligence. The error signal is amplified by the valve excitation amplifier 616 and energizes the servo valve 106 for the carriage drive servomotor 104 to reposition the carriage 74 and tube 40.

When the tube 40 is properly positioned with respect to the bending head 30 the actuator 50 thereof is energized, as by a relay (not shown) responsive to a null in the feedback circuit, to effect a bend in the tube 40 with its inherent rotation of the table 64. Rotation of the table 64 is sensed by the feedback transducer 284 and, at such times as the table 64 is in a position other than the position dictated by the numerical input intelligence, the voltage generator 612 sends an error signal to the valve excitation amplifier 615 which energizes the servo valve 620 for the actuator 50 in accordance with the error signal.

It is to be noted that the torque actuators or ROTACS 256 and 320 are energized to resist rotation of the table 64 and of the movable wing die 62 under the aforementioned bias of the ram die 52. This resistance to rotation effects the aforementioned wiping action of the dies 52, 56 and 62 on the tube 40.

Upon completion of a bend in the tube 40 the ram die 52 is moved transversely of its carriage 510 and the table 64 by energization, due to, for example, a null in the feedback circuit of the transducer 284, of the hydraulic actuator 532, thereby to condition the tube 40 for advancement through and rotation with respect to the bending head 30.

The carriage 74 then advances to the next position dictated by the numerical input intelligence. Assuming that the next bend in the tube 40 is to be effected in a radial plane angularly related to the plane of the first bend, as dictated by the input intelligence, a command voltage from the voltage generator 612 effects energization of the valve excitation amplifier 618 and servo valve 184 to effect rotation of the arbor head drive motor 183. The motor 183 is energized until the arbor 122 rotates to a position sensed by the feedback transducer 186. The tube 40 is then conditioned for the next bend, the angle of which again will be dictated by the numerical input intelligence as sensed by the feedback transducer 284.

It is to be noted that, if desired, bend of different radii can be effected in the tube 40 by hitting the tube 40 as closely spaced axial positions to produce a composite bend.

From the foregoing description it should be apparent that the bending in accordance with the present invention automatically effects a bend in a tube with mutually complementary ramming, wiping, and rolling actions at an axial position, in a radial plane, and to an angle dictated by numerical input intelligence under the control of a numerical control system.

It is to be understood that the specific details herein disclosed and described are presented for the purpose of explanation and illustration and that modifications may be made without departing from the spirit and scope of the invention.

I claim:

1. The method of bending a tube comprising the steps of supporting one end of the tube for axial movement and rotation to a desired axial and rotative positive with respect to a first bending die, sensing the actual axial and rotative position of the tube, feeding back an energizing signal in accordance with any difference between the desired and sensed position to the supporting means for effecting axial and rotative movement to the desired position, supporting an adjacent free section of the tube in a second die, drawing a third die against the tube between said first and second dies to effect a bend in the tube, sensing the angle of bend in the tube, and feeding back an energizing signal in accordance with any difference between the sensed angle and a desired angle to a means for drawing said third die against the tube.

2. The method of bending a tube comprising the steps of fixedly supporting one end of the tube for axial movement and rotation, moving the tube to an axial and rotative position with respect to a first die, supporting an adjacent free section of the tube in a second die, and drawing the tube against a third die having an arcuate face with a radius equal to the radius of bend.

3. The method of bending a tube comprising the steps of supporting one end of the tube for axial movement and rotation to a desired axial and rotative position with respect to a first bending die, sensing the actual axial and rotative position of the tube, feeding back an energizing signal in accordance with any difference between the desired and sensed position to the supporting means for effecting axial and rotative movement to the desired position, supporting an adjacent free section of the tube in a second die, drawing the tube against a third die to effect a bend in the tube, sensing the angle of bend in the tube, and feeding back an energizing signal in accordance with any difference between the sensed angle and a desired angle to a means for drawing the tube against said third die.

References Cited
UNITED STATES PATENTS

| | | | |
|---|---|---|---|
| 2,306,224 | 12/1942 | Parker et al. | 72—27 |
| 2,430,217 | 11/1947 | Eastes | 72—27 |
| 2,456,675 | 12/1948 | Chaille | 72—396X |
| 2,779,382 | 1/1957 | Anello | 72—389 |
| 2,800,161 | 7/1957 | Anello | 72—396 |
| 2,887,141 | 5/1956 | Bower et al. | 72—396 |
| 2,956,609 | 10/1960 | Shaw, Jr. | 72—27 |
| 2,998,838 | 9/1961 | Byrd, Jr. | 72—389X |
| 3,009,508 | 11/1961 | Kelley | 72—27 |
| 3,021,886 | 2/1962 | Ferris | 72—389X |
| 3,299,681 | 1/1967 | Hautau | 72—7 |
| 3,426,562 | 2/1969 | Inda | 72—7 |

MILTON S. MEHR, Primary Examiner

U.S. Cl. X.R.

72—27, 389, 396